United States Patent [19]

Gammon

[11] 4,265,644
[45] May 5, 1981

[54] CONDENSATION OF METAL VAPOR

[75] Inventor: Michael W. Gammon, Oen, England

[73] Assignees: Metallurgical Processes Limited; I.S.C. Smelting, both of The Bahamas

[21] Appl. No.: 90,125

[22] Filed: Nov. 1, 1979

[30] Foreign Application Priority Data

Nov. 24, 1978 [GB] United Kingdom ............... 45975/78

[51] Int. Cl.$^3$ ...................... B01D 47/06; C22B 19/04
[52] U.S. Cl. .................................. 55/257 NP; 75/88;
266/150; 13/8; 55/414
[58] Field of Search ............. 55/257 R, 257 MP, 414,
55/416; 13/8; 75/88; 266/150; 138/39; 165/111

[56] References Cited

U.S. PATENT DOCUMENTS

| | | | |
|---|---|---|---|
| 1,837,901 | 12/1931 | Föttinger et al. ........................ | 138/39 |
| 4,042,379 | 8/1977 | Harris et al. ............................ | 75/88 |

FOREIGN PATENT DOCUMENTS

| | | | |
|---|---|---|---|
| 20676 | 12/1934 | Australia ....................................... | 75/88 |
| 601248 | 4/1948 | United Kingdom . | |
| 608442 | 9/1948 | United Kingdom . | |
| 686585 | 1/1953 | United Kingdom ........................ | 75/88 |

*Primary Examiner*—David L. Lacey
*Attorney, Agent, or Firm*—Holman & Stern

[57] ABSTRACT

A lead-splash condenser for condensing metal vapor from a hot gas stream, comprising a plurality of condensation chambers, spray generating means provided in each condensation chamber, an inlet for passage of a hot gas containing metal vapor to the first condensation chamber, an outlet for passage of the gas from the last condensation chamber, and a stack communicating with the outlet of the last condensation chamber, wherein the stack is provided with gas deflector means for deflecting the gas stream from the side wall of the stack facing the outlet of the last condensation chamber so as to obtain a more uniform gas distribution in the stack, and to thereby reduce the rate of droplet elutriation in the gas stream leaving the condenser.

5 Claims, 4 Drawing Figures

CONDENSATION OF METAL VAPOR

BACKGROUND OF THE INVENTION

1. Field of the Invention

This invention relates to the condensation of metal vapor, and more particularly to a lead-splash condenser for condensing metal vapor, especially zinc vapor, from a hot gas stream.

2. Description of the Prior Art

A pyrometallurgical zinc smelting process is known in which oxidic zinc/lead material is reduced with coke in the shaft of a blast furnace. A hot gas stream, containing zinc vapor, passes from the top of the furnace shaft to a multi-stage lead-splash condenser, wherein the zinc vapor is condensed in a plurality of condensation chambers by a spray of molten lead droplets. Molten lead containing dissolved zinc is withdrawn from the condenser and cooled to effect a separation of molten zinc, and cooled de-zinced molten lead is recirculated to the condenser. Such a smelting process is more fully described in "Application of the Blast Furnace to Zinc Smelting" by Morgan & Woods, Metallurgical Review 16, November 1971.

The gas leaving the condenser, from which most of the zinc vapor has been condensed, is scrubbed to remove fume and dust carried over from the furnace shaft. Large quantities of leady, mainly oxidic, material known as "blue powder" are recovered and returned to the furnace shaft for re-smelting. The production of blue powder, mainly caused by the oxidation of lead and zinc emission from the furnace and condenser, is undesirable for a number of reasons.

The recycled load of blue powder to the furnace shaft reduces the capacity of the furnace to smelt new metal; additional coke has to be burnt to recover metal values, and the condenser gas offtake ducts become severely accreted after a period of operation.

The blue powder contains about 30% by weight lead and 30% by weight zinc, the balance consisting of oxides and sulphides of iron and other metalliferous materials. The zinc content arises from the oxidation of unabsorbed zinc vapor leaving the condenser, while the lead content arises partly from the volatilization of lead sulphide in the furnace shaft and partly from the elutriation of lead droplets in the gas stream leaving the condenser.

In a conventional lead-splash condenser the gas outlet duct from the condenser is reached via a substantially vertical stack. We have now found that the gas flows in a stream up the stack along the side wall thereof which faces the outlet from the last condensation chamber, i.e. along the end wall of the condenser, at a relatively high speed. Typically, the speed of the gas stream along this side wall of the stack may be about four times the theoretical speed which would prevail under ideal conditions of uniform gas flow through the stack. The relatively high streaming velocity of the gas tends to increase the rate of droplet elutriation, and it is an aim of the present invention to improve the gas flow distribution pattern in the stack and to thereby reduce the rate of elutriation of lead droplets in the gas stream leaving the condenser.

SUMMARY OF THE INVENTION

The present invention provides a lead-splash condenser for condensing metal vapor from a hot gas stream, comprising a plurality of condensation chambers, spray generating means provided in each condensation chamber, an inlet for passage of a hot gas containing metal vapor to the first condensation chamber, an outlet for passage of the gas from the last condensation chamber, and a stack communicating with the said outlet, wherein the stack is provided with gas deflector means for deflecting the gas stream from the side wall of the stack facing the said outlet so as to obtain a more uniform gas distribution in the stack.

Preferably the gas deflector means is constituted by a recess in that side wall of the stack which faces the outlet from the last condensation chamber, so as to effectively constitute an extension chamber of the stack for the purpose of modifying the gas distribution pattern in the stack.

Alternatively the gas deflector means may comprise a baffle disposed at a height above the outlet from the last condensation chamber and projecting inwardly from that side wall of the stack which faces the condensation chamber outlet.

The baffle is suitably inclined downwardly, preferably at an angle of from 50° to 80°, more preferably at an angle of about 60°, to the horizontal, to reduce the accumulation of accretion on the upper surface thereof.

It will be understood that while the abovementioned recess and baffle constituting gas deflector means will normally be employed as alternative constructions, nevertheless it would be possible to use both such a recess and baffle in combination to obtain a desired gas distribution pattern in the stack.

As a further alternative, the gas deflector means may be formed by a portion of the stack tapered towards the condensation chamber outlet so as to effectively form a throat.

BRIEF DESCRIPTION OF THE DRAWINGS

The invention will be further described, by way of example only, with reference to the accompanying drawings, in which.

DESCRIPTION OF THE PREFERRED EMBODIMENTS

Figure 1:
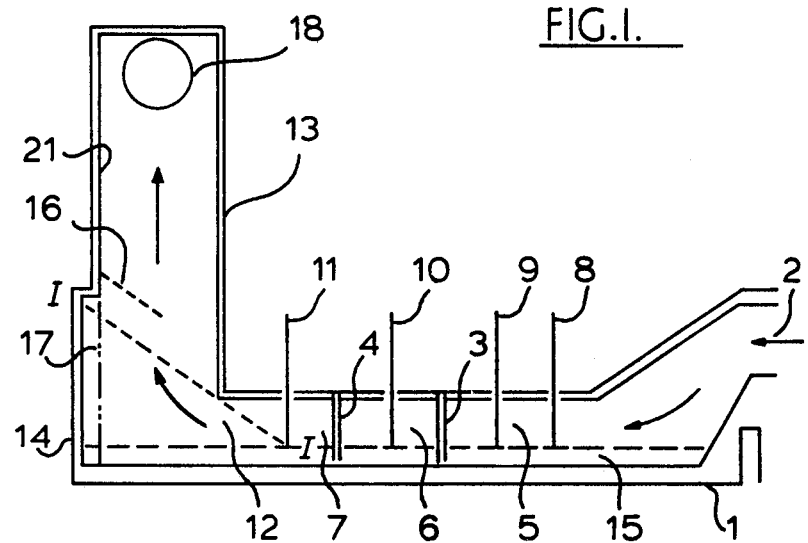
FIG. 1 is a schematic side elevational view of a lead-splash condenser including a portion of a gas off-take arrangement therefrom, and illustrating two alternative forms of gas deflector means in accordance with the invention.

FIG. 1 shows a lead-splash condenser 1 which has a gas inlet 2 connected by a duct, not shown, to the shaft of a zinc smelting blast furnace. The condenser 1 is divided by means of vertical partitions 3 and 4 into a series of intercommunicating condensation chambers 5, 6 and 7 provided with spray generating means in the form of rotors 8, 9, 10 and 11. An outlet aperture 12 constituting the outlet from the last condensation chamber 7 communicates with the base of a stack 13 provided in the side wall 21 thereof which faces the outlet 12 with a recess 14 constituting gas deflector means. The recess 14 extends vertically beyond the highest trajectory (I—I) of the spray of molten lead droplets generated in the chamber 7 by the rotor 11 and thrown through the outlet 12. The top of the stack 13 is provided with a gas outlet duct 18 which communicates with a gas washing stage, not illustrated.

In operation, hot gas containing zinc vapor passes through the inlet 2 into the condensation chambers 5, 6 and 7 wherein it is subjected to an intense spray of molten lead droplets generated by the rotors 8, 9, 10 and 11 which are immersed in a counter-currently flowing stream 15 of molten lead. The zinc vapor is condensed and dissolves in the molten lead which is continuously withdrawn from the condenser, by means not shown, and further treated for the recovery of molten zinc. After separation of the zinc, cooled lead is continuously returned to the condenser, by means not shown.

Figure 2:
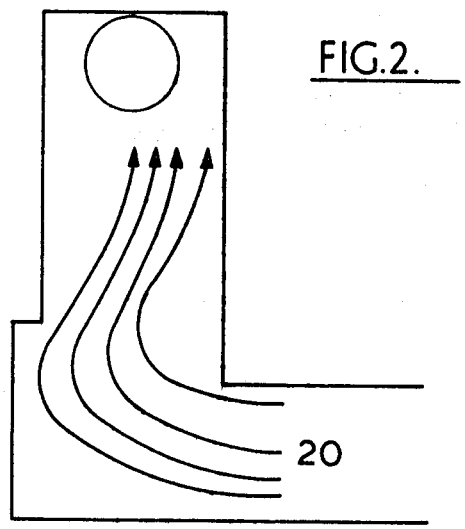
FIG. 2 is a schematic illustration of the gas flow pattern in a condenser according to the invention provided with gas deflector means in the form of a recessed stack side wall.
Figure 3:
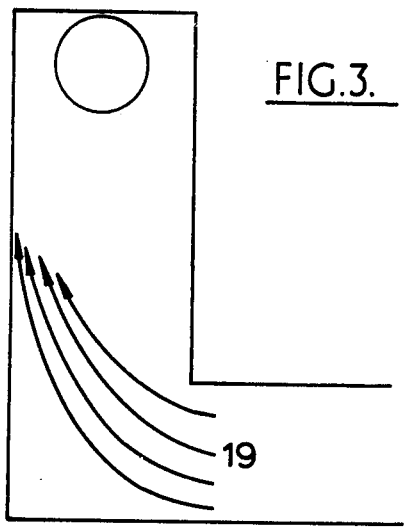
FIG. 3 is a comparative schematic illustration showing the gas flow pattern in a conventional condenser not provided with any such gas deflector means.

Gas containing entrained lead droplets, uncondensed zinc vapor and small quantities of volatilized materials flows through the outlet 12 towards the recess 14 and is deflected thereby inwardly from the wall 21 of the stack 13. The gas flow distribution pattern through the stack 13 is illustrated by flow lines 20 in FIG. 2. In comparison, the gas flow distribution pattern in a conventional condenser arrangement is illustrated by flow lines 19 in FIG. 3, from which it may be seen that gas flows more uniformly through the stack 13 provided with the recess 14.

This improvement in the gas flow distribution pattern through the stack 13 reduces the maximum gas velocity in the stack, resulting in a proportionate reduction in the lead droplet elutriation rate.

The rotor 11 in the last condensation chamber 7 generates a non-entrained spray, a proportion of which emerges through the outlet 12 and has an upper trajectory represented by the broken line I—I in FIG. 1. The interior of the recess 14 forms a trap chamber disposed to receive and collect this non-entrained spray of molten lead droplets emerging through the outlet 12, the collected droplets returning to the lead stream 15 at the base of the recess 14. The collection and retention of the non-entrained spray within the relatively gas-quiescent interior of the recess 14 also reduces the entrainment of relatively fine lead droplets which may be produced by secondary splashing of the spray within the interior of the recess 14.

FIG. 1 further illustrates a second embodiment of gas deflector means defined by a baffle 16, shown by phantom lines, disposed above the height of the outlet 12 and inclined downwardly and inwardly from the side wall 21 of the stack facing the outlet 12 and the lower portion 17, shown by phantom lines, when there is no recess 14 provided.

In operation, this form of gas deflector means functions essentially in the same manner as the recess 14 described above, the baffle 16 deflecting the gas inwardly from the lower wall portion 17 of the stack 13 resulting in a more uniform gas flow distribution pattern in the upper portion of the stack.

Moreover, the baffle 16 together with the lower wall portion 17 form a relatively gas-quiescent region for the collection and retention of the spray emerging through the outlet 12.

Figure 4:
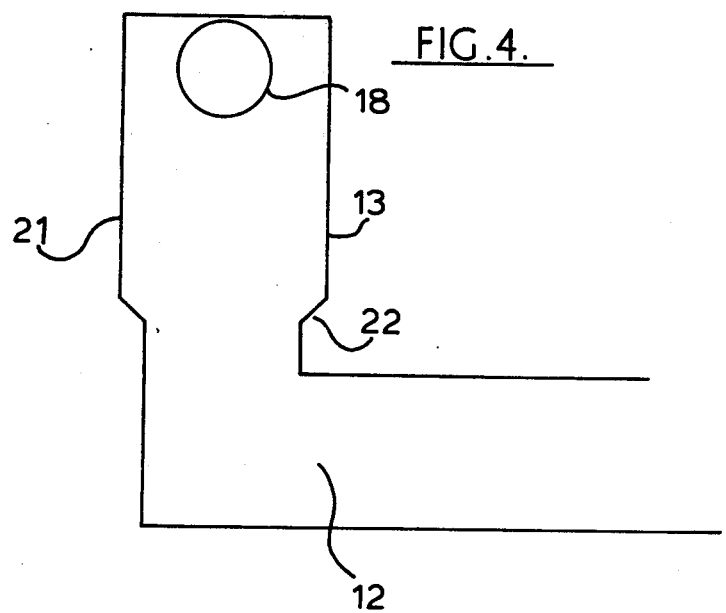
FIG. 4 is a schematic side elevational view illustrating another embodiment of a gas deflector means of a condenser according to the invention.

FIG. 4 illustrates a further form of gas deflector means in accordance with the invention. In this embodiment the condenser stack 13 is widened in cross-sectional area above the roof of the condenser chamber, and the gas deflector means is constituted by a portion 22 of the stack 13 which tapers towards the outlet 12 of the last condensation chamber to effectively form a throat in the stack. This construction serves to decrease the linear velocity of the gases in the widened part of the condenser stack and to alter the gas flow distribution within the stack to thereby reduce the rate of elutriation of lead droplets in the gas stream leaving the condenser.

In the construction illustrated in FIG. 4 the gases flowing up the condenser stack 13 show less tendency to stream up the stack walls above the throat area than they do below it. Thus, above the throat the gases tend to be deflected away from the side wall 21 of the condenser stack which faces the outlet 12, and their linear velocity is generally reduced.

What I claim is:

1. A lead-splash condenser for condensing metal vapor from a hot gas stream, comprising a plurality of intercommunicating condensation chambers; spray generating means provided in each condensation chamber; an inlet for passage of a hot gas containing metal vapor to the first condensation chamber, said inlet communicating with said first condensation chamber; an outlet for passage of the gas from the last condensation chamber, said outlet communicating with said last condensation chamber; and a stack communicating with said outlet, wherein the stack is provided with gas deflector means for deflecting the gas stream from the side wall of the stack facing said outlet so as to obtain a more uniform gas distribution in the stack.

2. The condenser according to claim 1, wherein the gas deflector means comprises a recess formed in the side wall of the stack facing said outlet.

3. The condenser according to claim 1, wherein the gas deflector means comprises a baffle disposed at a height above said outlet and projecting inwardly from the side wall of the stack which faces said outlet.

4. The condenser according to claim 3, wherein the baffle is inclined downwardly at an angle of from 50° to 80° to the horizontal.

5. The condenser according to claim 1, wherein the gas deflector means comprises a portion of the stack tapered towards said outlet to form a throat.

* * * * *

UNITED STATES PATENT AND TRADEMARK OFFICE
CERTIFICATE OF CORRECTION

PATENT NO. : 4,265,644
DATED : May 5, 1981
INVENTOR(S) : Michael William Gammon

It is certified that error appears in the above—identified patent and that said Letters Patent is hereby corrected as shown below:

On the cover sheet, Item (73) Assignee should read:

-- Metallurgical Processes Limited, and I.S.C. Smelting Limited, carrying on business together in the Bahamas under the name and style of Metallurgical Development Company --.

Signed and Sealed this

Tenth Day of November 1981

[SEAL]

Attest:

GERALD J. MOSSINGHOFF

Attesting Officer · Commissioner of Patents and Trademarks